United States Patent [19]

Glatt et al.

[11] Patent Number: 4,639,132
[45] Date of Patent: Jan. 27, 1987

[54] DIRECT DETERMINATION OF MODULATION TRANSFER FUNCTION BY MOIRE DEFLECTROMETRY

[75] Inventors: Ilana Glatt, Beer-Sheva; Aminadav Livnat, Arad; Oded Kafri, Beer-Sheva, all of Israel

[73] Assignee: The State of Israel, Israel

[21] Appl. No.: 627,657

[22] Filed: Jul. 3, 1984

[51] Int. Cl.[4] ............................................. G01M 11/00
[52] U.S. Cl. ................................................... 356/124.5
[58] Field of Search ........................... 356/124, 124.5

[56] References Cited

U.S. PATENT DOCUMENTS 3,771,879  11/1973  Chambu et al. ................. 356/124.5
4,459,027   7/1984  Kafri et al. ........................ 356/128

OTHER PUBLICATIONS

Goodman et al. "High Spatial Frequency MTF Measurement Scheme" *IBM Technical Disclosure Bulletin*, vol. 25, No. 10, (Mar. 1983), pp. 5056–5057.

Primary Examiner—R. A. Rosenberger
Attorney, Agent, or Firm—Steinberg & Raskin

[57] ABSTRACT

A system and method for determining modulation transfer function (MTF) of an optical element or system employs a moire deflectometer. A selected central portion of monochromatic light is directed to the first grating of the moire deflectometer through or from the optical system, resulting in a moire pattern in which the contrast along an axis incident to the moire fringes is indicative of the MTF of the optical system for a particular spatial frequency, which is dependent on the spacing between the gratings of the moire deflectometer.

7 Claims, 6 Drawing Figures

DIRECT DETERMINATION OF MODULATION TRANSFER FUNCTION BY MOIRE DEFLECTROMETRY

BACKGROUND OF THE INVENTION

The present invention is generally directed to a method and apparatus for the determination of the modulation transfer function of optical systems and, more particularly, by using a deflectometric moire fringe pattern.

The MTF is a quantitative measure of image quality. It describes the ability of an optical system as a function of spatial frequency to transfer the contrast of an object to the image. The MTF data, together with the focal number and physical dimensions of an optical element, provide a comprehensive description of the expected performance, and as such, are indispensable in optical design of multi-components imaging systems. The MTF concept is also most useful in defining the degradation of image quality caused by turbulent atmosphere. The turbulence of the atmosphere has a detrimental effect on air reconnaissance, outdoor photography, and in general, whenever a telescopic camera is used.

MTF is nowadays considered far superior to any of the classical resolution criteria, which only set an upper bound to the spatial frequency which can be resolved. MTF, on the other hand, provides the system's response over practically the entire spectrum of spatial frequencies. Therefore, MTF determination has become a routine test of optical products, and MTF data is supplied by the manufacturers of high performance optical equipment.

Prior art methods for MTF determination can be divided into two categories. They are direct measurements and indirect measurements of MTF. The first approach is based on the use of test target, usually linear gratings, as the object in the tested optical system. The contrast of the image formed by the system is compared to that of the original object. The ratio provides the required MTF at the grating's frequency. A full MTF curve is obtained by scanning with a series of such gratings, to cover the desired spectral range of spatial frequencies. This method is clearly cumbersome, since it involves repeated scanning with a whole series of gratings of respectively differing spatial frequencies. Furthermore, although the MTF concept is defined and, hence, the measurement is accurate only for sine wave gratings, because of the difficulties in producing high quality sine wave gratings, usually bar-test charts, known as square wave gratings, which are easier to manufacture, are employed. Therefore, the derived MTF curves, measured with square wave gratings, deviate from the theoretical value.

The indirect approach of deriving MTF curves is based on Fourier analysis of the line spread function, obtained by a narrow slit, preceding the tested system. This technique requires elaborate computation, and is therefor far less popular.

SUMMARY OF THE INVENTION

It is an object of the invention to provide a new apparatus and method for direct MTF determination, which do not include the afore-mentioned disadvantages of the prior art methods.

Another object of the present invention is to provide a new apparatus for direct measurement of MTF as a function of spatial frequency with a minimum number of gratings and which is easily operable to provide accurate data.

Another object of the present invention is to provide means for determining the degree of turbulence of a medium, air or liquid based on image quality degradation on passing the turbulent medium.

Briefly, the novel system and method for the determination of MTF is based on measuring the contrast of the fringes in the pattern produced by a moire deflectometer.

The system typically comprises a collimated light source, preferably of incoherent nature, and the tested optical element, which can be either reflecting or transmitting, positioned in the path of the collimated beam. A first grating which is part of a moire deflectometer follows the test object, with its face normal to the direction of light. A second grating, identical to the first grating is positioned parallel, but displaced by a certain distance d from the first grating, and rotated relative to the first grating by an angle $\theta$. A photodetector for measuring the light intensity, transmitted by the gratings, as a function of relative position is mounted on a translator to provide linear scan of the transmittance across the fringe profile.

The primary feature of the present invention is to provide a MTF curve of a tested object by measuring the contrast degradation due to light diffraction, as a function of the distance d.

An important advantage of the present invention over prior art systems and methods for MTF determination is the tunability, attainable by the present invention. This is offered by changing the distance d between the two gratings of the moire deflectometer. Hence, the entire spectrum of spatial frequencies can be scanned by a single pair of gratings.

BRIEF DESCRIPTION OF THE DRAWINGS

The novel features of the invention are set forth with particularity in the appended claims. The invention will best be understood from the following description when read in conjunction with the accompanying drawings.

DESCRIPTION OF PREFERRED EMBODIMENTS

Before describing a specific embodiment of the invention attention is directed to the following general explanation.

The present invention for determining MTF is based on the reduction of the contrast of moire fringes formed by a moire deflectometer, due to loss of beam quality on passing an optical system, be it transmissive or reflective.

The modulation, M, of a fringe profile is defined as the ratio of the peak-to-valley intensity difference in the measured moire pattern, and the peak intensity of a moire pattern formed by an ideally collimated beam, specifically, $$M = \frac{I_{max} - I_{min}}{I_{max} + I_{min}},$$

where $I_{max}$ and $I_{min}$ are the maximum and minimum intensities measured. The MTF at a given spatial frequency l/p, where p is the pitch of the grating, is simply $$MTF(l/p) = M(l/p) = 1 - \delta\Omega^{\frac{1}{2}}d/P$$

where $\delta\Omega$ is the solid angle of scattering of radiation.

The operation and utilization of the present invention will now become more fully apparent from the description of preferred embodiment, in conjunction with the Figs.

Figure 1:
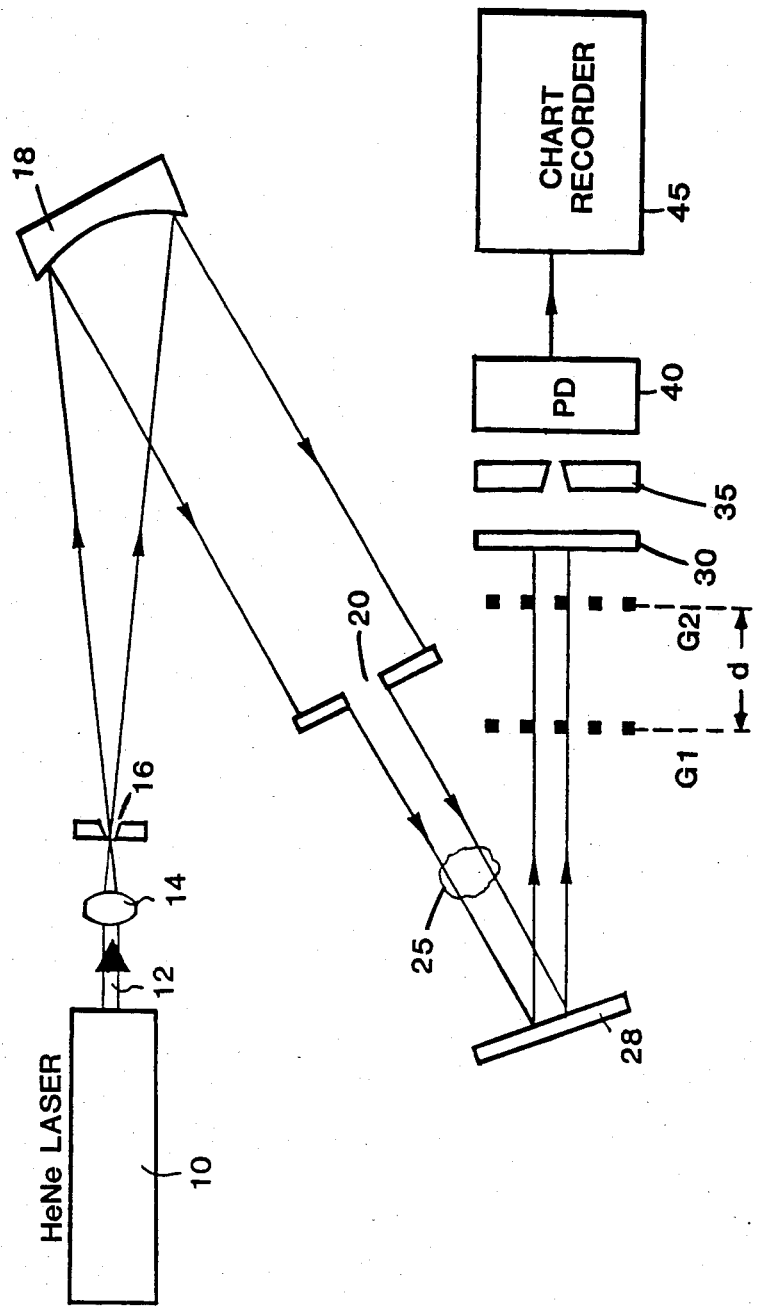
FIG. 1 is a diagram of an apparatus for measuring MTF, in accordance with the present invention.

FIG. 1 shows one embdiment of apparatus of the invention for direct measurement of MTF. For demonstration purposes, the light source is a 7 mW HeNe laser 10, emitting light at 633 nm. However, a non-coherent, yet collimated and monochromatic source with a low beam divergence, may be utilized as well. The narrow beam 12, provided by the laser 10, is expanded by means of a reversed telescope, composed of a spatial filter, in the form of an objective lens 14, a 25 micron pinhole 16, and a parabolic mirror 18 in an off-axial configuration. The broad beam diameter can and should be confined by using an aperture 20 of defined dimensions. The diffraction-limited divergence of the collimated beam, provided a circular aperture 20 of diameter a is used, is given by $\lambda/a$, where $\lambda$ is the wavelength of the light source.

The tested phase object 25 is positioned in the path of the collimated beam, defined by the extremes of the beam. The beam emerging from the tested phase object 25 is then reflected from a flat mirror 28 and aligned to normal incidence at the front grating G1. When the tested element is a reflecting surface, it merely replaces the flat mirror 28 and the distorted reflected beam is directed to the grating G1 as before.

The grating G1 together with grating G2 form a complementary pair of a negative and positive, prepared from the same original Ronchi ruling of 6 lines/mm, in order to compensate for imperfections of the grating. The distance between G1 and G2, designated d, is is varied so that the gratings are located at mutual distances which are integer multiples of $p^2/\lambda$, known as a Fourier plane. Only at such planes the image of a square wave grating is an identical replica of the object.

Therefore MTF, measured with square wave gratings, should be expressed in terms of m, the integer multiple of $p^2/\lambda$. Specifically:

$$MTF = 1 - \delta\Omega^{\frac{1}{2}} \cdot \frac{mp^2}{\lambda} \cdot \frac{1}{p}.$$

Since $\delta\Omega^{\frac{1}{2}}$ is proportional to the diffraction-limited angle $\lambda/a$, or $\delta\Omega^{\frac{1}{2}} = C\lambda/a$, where C is constant for a given beam, the above expression for MTF can be rearranged:

$$MTF = 1 - C\frac{mp}{a}.$$

Here, mp/a is equivalent to the reduced spatial frequency.

The light transmitted by the pair of gratings G1 and G2 is filtered by a narrow band pass filter 30, matched to the wavelength of the source 10. The light then passes through a very narrow slit 35, e.g. of a width of 100 micron, whose direction coincides with the direction of the fringes.

The filtered light intensity is measured by a linear response photodiode 40 and the output signal is fed into a chart recorder 45. The detector assembly, including the filter 30 and slit, is mounted on a micropositioner, driven by a dc motor, to enable scanning of the signal across the fringe profile.

Figure 2A:
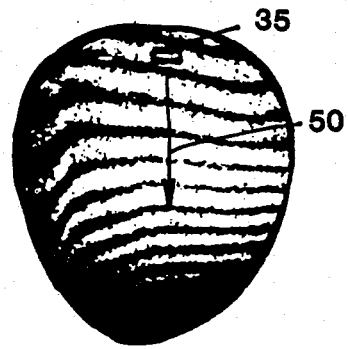
FIGS. 2a-2d show examples of moire deflectograms together with the respective intensity profiles, obtained by the apparatus shown in FIG. 1.
Figure 2C:
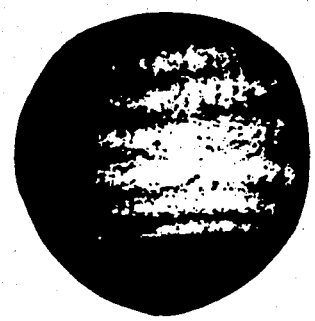
Figure 2B:
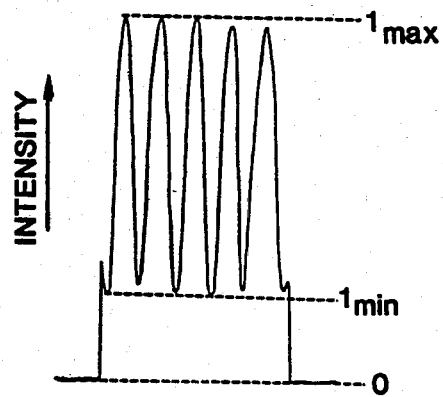

This aspect may further be explained by referring to FIGS. 2a and 2b. FIG. 2a is a photograph of the moire pattern of a polished metal surface taken with a Polaroid type camera focused at a mat screen placed right behind the rear grating G2. Imposed on the moire pattern is the slit 35 which is moved by the micropositioner in the direction designated by arrow 50, perpendicular to the fringe direction.

FIG. 2b represents the intensity distribution across the fringe pattern obtained by scanning with the detector for the same object shown in FIG. 2a.

Figure 2D:
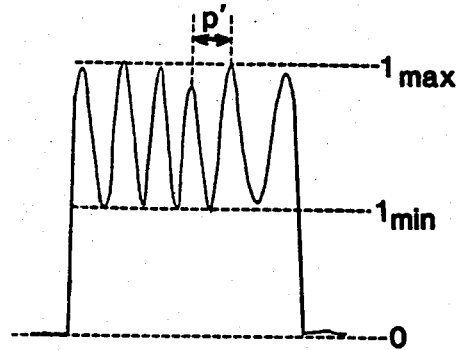

FIGS. 2c and 2d are similar to FIGS. 2a and 2b, respectively, but obtained by a different surface of lesser surface quality. The different contrast of the two surfaces is revealed in the two fringe patterns of FIGS. 2a and 2c and is clearly manifested in the different intensity distribution curves of FIGS. 2b and 2d.

The scanning of the intensity distribution across the fringe profile (see FIG. 2a) is not limited to the use of a single photodiode 40. A linear array of diodes or a CCD, coupled to a multi-channel analyzer, providing simultaneous monitoring of the entire region of interest, may be employed. Another means for the same purpose, also utilized by the inventors, is a CCTV system, equipped with a line selector, which reduces a single line out of a TV frame and enables smoothing by averaging of numerous scans.

Figure 3:
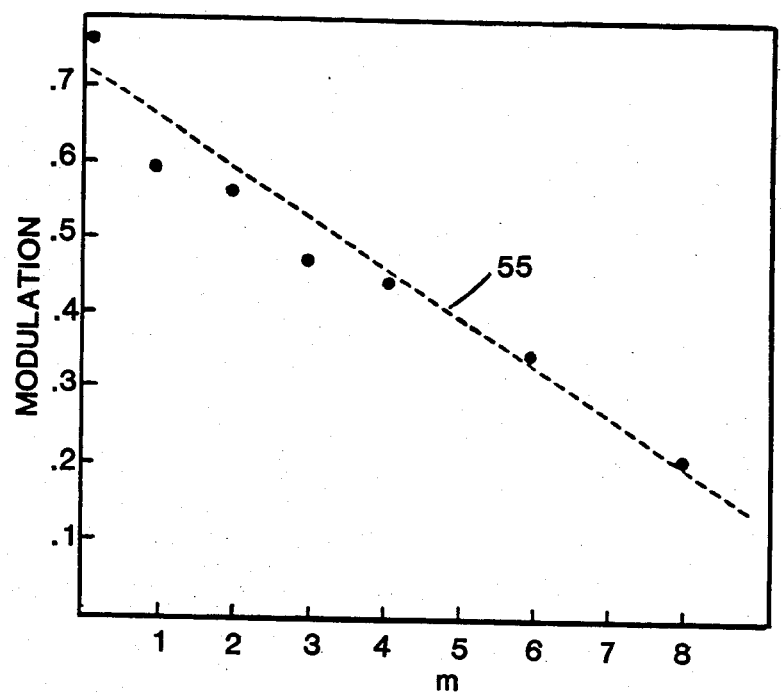
FIG. 3 shows a typical MTF curve of an object obtained with the apparatus of FIG. 1, by varying the distance between the gratings.

Attention is now directed to FIG. 3 which shows a plot of the modulation obtained for a polished metal surface as a function of a distance d between the gratings G1 and G2. The distance is given in units of m, the integer multiple of $p^2/\lambda$. This plot is in fact the equivalent of a MTF curve, of a rectangular aperture made with a triangular grating, where the modulation transfer function is plotted vs. the spatial frequency in terms of m. A linear curve of MTF is expected due to the use of a rectangular aperture 12 mm wide, and the dashed line 55 is a best fit of the experimental data points.

In FIG. 3 the MTF is measured only at specific distances corresponding to the discrete spatial frequencies defined by the Fourier planes, where m is an integer multiple of $p^2/\lambda$. This is due to the fact that gratings G1 and G2 are square wave gratings. However, if sine wave gratings were to be employed, a continuous MTF curve could be obtained for the entire range of spatial frequencies, rather than at discrete ones.

In practicing the present invention to determine the MTF of a given phase object or a reflective surface, the following steps should preferably be followed. A reference MTF should be recorded for the apparatus excluding the test object. Then the tested element should be inserted in the system and the total MTF should be recorded. The ratio of the latter MTF and the reference MTF is, due to the cascading property of MTF, i.e. the net MTF of the tested element.

It is appreciated that in the practice of the invention limitations on sensitivity or accuracy may arise from imperfections of the gratings (G1 and/or G2), the slit 35 and/or from any inhomogeneity of the light beam. Care in the manufacture of the gratings can reduce imperfections. As to inhomogeneity of the light beam, it is preferred to produce a broad beam, like that shown reflected by the mirror 18 in FIG. 1 and permit only a small central section to pass through the aperture 20, at diameter a.

The invention can be used for MTF determination of optical components of any kind, transmitting or reflecting, as well as multi-component optical systems. It can also be used for measuring MTF of turbulent media, like the atmosphere, or fluids in motion. One of the applications which was practiced was the determination of the rate of mixing of miscible liquids with different indices of refraction, by recording the variation in fringe contrast as a function of time. Clearly the foregoing are only examples of application of the present invention.

Another advantage of the present invention which is particularly demonstrated in FIG. 2a, is that moire deflectometry, unlike any of the other techniques for MTF determination, offers simultaneous measurement of the MTF due to diffraction and the geometric aberrations of the tested object. The geometric aberrations are indicated by the deviations of the moire fringes from straight lines.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A method of determining the modulation transfer function of an optical system, said method comprising the steps of
   directing a parallel light beam via the system on to a pair of spaced apart gratings having a predetermined angular orientation so as to produce a moire pattern;
   varying the spacing of the gratings; and
   detecting and recording the contrast of the moire pattern as a function of said spacing so as thereby to determine said modulation transfer function.

2. A method as claimed in claim 1, wherein said parallel light beam is reflected from said optical system.

3. A method as claimed in claim 1, wherein said parallel light beam is transmitted through said optical system.

4. Apparatus for determining the modulation transfer function of an optical system, said apparatus comprising
   means for producing a parallel beam of light;
   first directing means for directing said beam to said optical system;
   a pair of spaced apart grating having a predetermined angular orientation;
   said directing means for directing light from said optical system on to said gratings so as to form a moire pattern;
   means for varying the spacing of said gratings; and
   means for detecting and recording the contrast of said moire pattern as a function of the spacing so as thereby to determine the modulation transfer function.

5. Apparatus as claimed in claim 4, wherein said light from said optical system is transmitted therethrough.

6. Apparatus as claimed in claim 4, wherein said light from said optical system is reflected therefrom.

7. A method as claimed in claim 1, wherein said light beam is monochromatic and collimated.

* * * * *